(Model.)

J. HITCHCOCK.
Sand Band for Vehicles.

No. 234,572.  Patented Nov. 16, 1880.

WITNESSES:
A. Schehl,
C. Sedgwick.

INVENTOR:
J. Hitchcock.
BY Munn & Co.
ATTORNEYS.

UNITED STATES PATENT OFFICE.

JONATHAN HITCHCOCK, OF ST. PAUL, MINNESOTA, ASSIGNOR TO HIMSELF AND DELOS M. WHITE, OF HUDSON, WISCONSIN.

SAND-BAND FOR VEHICLES.

SPECIFICATION forming part of Letters Patent No. 234,572, dated November 16, 1880.

Application filed April 30, 1880. (Model.)

*To all whom it may concern:*

Be it known that I, JONATHAN HITCHCOCK, of St. Paul, in the county of Ramsey and State of Minnesota, have invented a new Improvement in Journal and Bearing Protectors, of which the following is a specification.

Figure 1:
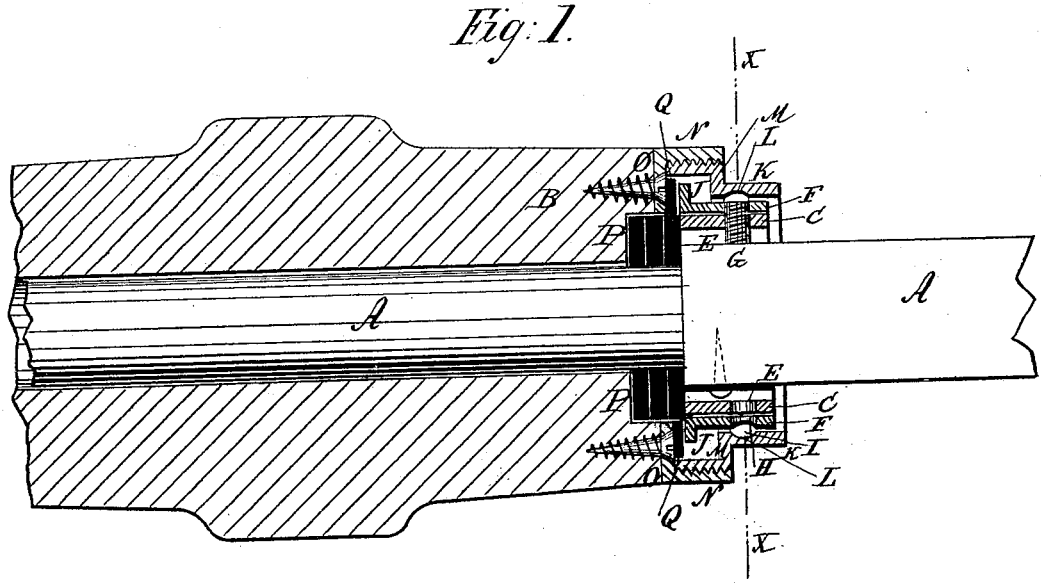
Figure 2:
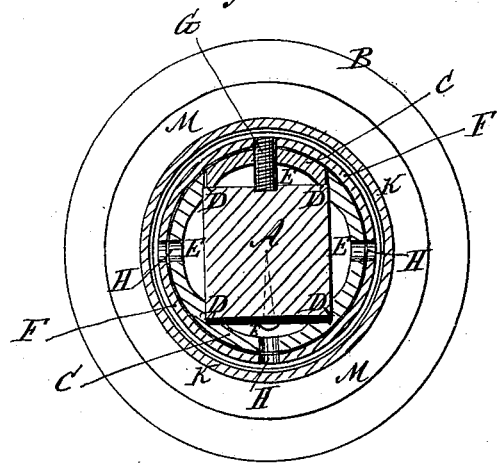

Figure 1 is a sectional elevation of the improvement, taken in line with the journal. Fig. 2 is a sectional elevation taken through the line *x x*, Fig. 1.

The object of this invention is to protect journals and their bearings from dust.

The invention consists in constructing a journal and bearing protector of a collar made in two parts with grooved projections and holes, a collar made with holes, a ring-groove, and a flange, a collar made with a ring-groove, an offset, and a screw-thread, and a collar made with a screw-thread and a flange, whereby dust will be effectually excluded from the journal and bearing, as will be hereinafter fully described.

I will describe the invention as applied to an axle and hub, but do not limit myself to that use, as it may be applied to any other journal and bearing with equal advantage.

A represents an axle or journal, and B represents a hub or bearing.

To the axle A, at its shoulder, is attached a ring or collar, C, which is made in two parts, so that it may be readily placed upon the axle A.

Upon the inner surface of the collar C are formed ribs or longitudinal projections D, which are grooved to receive the angles of the axle A when the axle is square, and which rest against the sides of the axle A, when applied to a round axle, thus forming in either case four chambers, E, to receive dust.

Upon the collar C is fitted a collar or band, F, which is secured to the collar C, and both collars, C F, are secured to the axle A by a set-screw, G. Through the collars C F are formed holes H, leading into the chambers E. Around the collar F, in line with the holes H, is formed a ring-groove, I, and around the inner end of the said collar F is formed an outwardly-projecting ring-flange, J.

Upon the collar F is placed a collar, K, the outer part of which fits upon the collar F, and has a ring-groove, L, in its inner surface corresponding with the groove I, the two grooves I L forming a channel, through which any dust that may work in between the collars F K may pass to the holes H, and thence out through the chamber E. The collar K is made with an offset, M, sufficient to allow its inner part to pass over the flange J, so that the said offset M may rest against the said flange J.

Upon the outer surface of the larger part of the collar K is cut a screw-thread, which fits into a screw-thread cut in the inner surface of the collar N. The collar N has an inwardly-projecting ring-flange, O, formed upon its inner end, which has holes formed through it to receive the screws that secure it to the hub or bearing B.

The inner ends of the chambers E are closed by the shoulder P formed upon the journal A, or by a collar, P, attached to the said journal.

A washer, Q, may be interposed between the flanges J O to lessen the friction, as shown in Fig. 1.

The washers P Q may be made of leather, leather-board, or other suitable material.

Having thus described my invention, what I claim as new, and desire to secure by Letters Patent, is—

1. A journal and bearing protector constructed substantially as herein shown and described, consisting of the collar C, made in two parts and having grooved projections upon its inner surface and holes through it, the collar F, having corresponding holes through it, a groove around it, and a flange upon its inner end, the collar K, having a groove around its inner surface, having an offset and screw-threads upon its larger part, and the collar N, having screw-threads upon its inner surface and a flange upon its inner end, as set forth.

2. In a journal and bearing protector, the combination, with the journal A and bearing B, of the four collars C F K N, substantially as herein shown and described, whereby dust is excluded from the journal and bearing, as set forth.

3. In a journal and bearing protector, the inner collar, C, constructed substantially as herein shown and described, made in two parts, and with grooved projections D and holes H to form chambers and passages for the escape of dust, as set forth.

4. In a journal and bearing protector, the collar F, constructed, substantially as herein shown and described, with holes H, a groove, I, and a flange, J, to secure the collar C in place, form passages for the escape of dust, and serve as a bearing and stop for the rotating collar K, as set forth.

5. In a journal-protector, the combination of the collar F, having holes H, ring-grooves I, and flange J, the collar K, having ring-groove L, offset M, and outer thread, and the inwardly-threaded collar N, having the ring-flange O, as shown and described.

JONATHAN HITCHCOCK.

Witnesses:
WILLIAM WEARS,
F. H. HARVEY.